United States Patent [19]

Garzarolli et al.

[11] Patent Number: 5,493,592
[45] Date of Patent: Feb. 20, 1996

[54] NUCLEAR-REACTOR FUEL ROD WITH DOUBLE-LAYER CLADDING TUBE AND FUEL ASSEMBLY CONTAINING SUCH A FUEL ROD

[75] Inventors: Friedrich Garzarolli, Höchstadt/Aisch; Eckard Steinberg, Erlangen, both of Germany

[73] Assignee: Siemens Aktiengesellschaft, Munich, Germany

[21] Appl. No.: 305,156

[22] Filed: Sep. 13, 1994

Related U.S. Application Data

[63] Continuation of PCT/DE93/00151, filed Feb. 22, 1993.

Related U.S. Application Data

[63] Continuation of a PCT/DE93/00151, filed Feb. 22, 1993.

[30] Foreign Application Priority Data

Apr. 30, 1992 [DE] Germany ............... 92 05 857.4 U

[51] Int. Cl.$^6$ ........................................ G21C 3/00
[52] U.S. Cl. ............... 376/416; 376/414; 376/417; 376/415; 376/457; 148/668; 148/672; 420/422
[58] Field of Search ...................... 376/416, 414, 376/417, 422, 415, 457; 148/668, 672; 420/422

[56] References Cited

U.S. PATENT DOCUMENTS

| | | | |
|---|---|---|---|
| 4,664,881 | 5/1987 | Ferrari et al. | 376/410 |
| 4,735,768 | 4/1988 | Stehle et al. | 376/417 |
| 4,751,044 | 6/1988 | Hwana et al. | 376/416 |
| 4,778,648 | 10/1988 | Ferrari | 376/457 |
| 4,963,316 | 10/1990 | Stehle et al. | 376/416 |
| 4,963,323 | 10/1990 | Matsuo et al. | 420/422 |
| 4,986,957 | 1/1991 | Taylor | 376/417 |
| 4,992,240 | 2/1991 | Komatsu et al. | 420/422 |
| 5,023,048 | 6/1991 | Mardon et al. | 376/416 |
| 5,073,336 | 12/1991 | Taylor | 376/457 |
| 5,211,774 | 5/1993 | Garde et al. | 148/421 |
| 5,245,645 | 9/1993 | Steinberg | 376/457 |

FOREIGN PATENT DOCUMENTS

| | | |
|---|---|---|
| 0165155 | 9/1986 | European Pat. Off. . |
| 0212351 | 3/1987 | European Pat. Off. . |
| 0301295 | 2/1989 | European Pat. Off. . |
| 0468093 | 1/1992 | European Pat. Off. . |
| 2602368 | 2/1988 | France . |

OTHER PUBLICATIONS

Database WPIL, Section Ch. Week 8709/Derwent, Class C, AN 87–062810 (09) and SE–A8406646 (Westinghouse).

Patent Abstracts of Japan, vol. 13, No. 275 (C≠610) [3623] Jun. 23, 1989 and JP–A01,073,037 (Toshiba).

Primary Examiner—Donald P. Walsh
Assistant Examiner—Meena Chelliah
Attorney, Agent, or Firm—Herbert L. Lerner; Laurence A. Greenberg

[57] ABSTRACT

A fuel rod has a cladding including a thicker inner layer and a thin outer layer being metallurgically bound thereto. In view of the conditions prevailing on the inside of the cladding tube and the mechanical properties of the entire cladding tube, the inner layer is formed of zircaloy having a comparatively high Sn content and a low Fe and Fe+Cr content. The outer layer also contains virtually only zircaloy constituents, but in view of corrosion, H2 take-up and sensitivity to Li dissolved in the cooling water, the Fe and Fe+Cr content is greater than or at most equal to that of the inner layer, the chosen Sn content is less than 1.3% and the chosen Sn+Fe+Cr content is more than 1.0%. Low failure rates of the cladding tube are thereby achieved even for long service lives.

27 Claims, 7 Drawing Sheets

NUCLEAR-REACTOR FUEL ROD WITH DOUBLE-LAYER CLADDING TUBE AND FUEL ASSEMBLY CONTAINING SUCH A FUEL ROD

CROSS-REFERENCE TO RELATED APPLICATION

This application is a International continuation of application Ser. No. PCT/DE93/00151, filed Feb. 22, 1993.

BACKGROUND OF THE INVENTION

1. Field of the Invention

The invention relates to a pressurized-water-cooled fuel assembly and to a fuel rod of such a fuel assembly having a cladding tube that encloses a fuel filling and which includes a first thicker inner layer that faces toward the fuel filling and is composed of a first zirconium alloy, and a second thinner outer layer which is metallurgically bound to the inner layer and is composed of a second zirconium alloy, the two zirconium alloys each containing at least the metals tin, iron and chromium as alloying constituents.

Zirconium is a comparatively soft metal which is particularly suitable for structural parts of nuclear reactors because of its low neutron absorption. It is technically generally manufactured as "sponge zirconium" having maximum impurities which are standardized for use in nuclear reactors. Since the fuel rods of reactor fuel assemblies are only finger-thin but are several meters long, a high strength which is constant even after prolonged irradiation and which is achieved by adding tin to the alloy is necessary for the fuel rods that are filled with fuel and for the guide tubes, spacers and other structural parts of the fuel assembly. In water, pure zirconium forms a thin oxide layer which protects the metal from further oxidation, but at the same time impurities incorporated in the structure of the zirconium or the oxide layer, particularly nitrogen, may considerably accelerate corrosion. Although the tin addition neutralizes the corrosive action of nitrogen, particularly in conjunction with small additions of iron, it promotes the corrosion itself at higher tin contents (as explained in the publication by B. Lustman and Frank Kerze entitled: "The Metallurgy of Zirconium", New York, 1955, page 538, FIG. 10.34 and page 628, FIG. 11.35). The iron addition hardens the alloy so that, even at comparatively low iron contents, processing the alloy to produce thin, long cladding tubes is virtually no longer possible. In addition, such an iron content results in an increased diffusion and absorption in the metal of hydrogen produced during the corrosion in water, with hydrogenated regions being formed (as explained in the publication by W. Berry, D. Vaughan and E. White entitled: "Hydrogen Pickup During Aqueous Corrosion of Zirconium Alloys" in: Corrosion, Vol. 17, No. 3, March 1961, page 109 t, FIG. 1) which are very brittle and drastically reduce the mechanical robustness of the material.

Therefore, on the basis of corrosion experiments in the laboratory in which the temperature was raised to accelerate the corrosion experiments, an optimum range was specified for the contents of tin and iron, which range was optimized as far as possible with regard to corrosion by additionally taking chromium and nickel alloying constituents into account, while attention was also being paid at the same time to an adequate mechanical and thermal robustness. The robustness investigations were partly carried out under reactor conditions in order to obtain adequate strengths even after prolonged irradiation. In the meantime, the alloys "Zircaloy 2" and "Zircaloy 4" developed in that process have proved essentially satisfactory in structural parts of fuel assemblies of water-cooled reactors. Table 1 shows the grades of sponge zirconium, Zircaloy 2 and Zircaloy 4 which are permitted as materials in reactor technology. In that publication, the amounts of the alloying constituents are specified as percentages by weight, based on the alloy.

Upon prolonged use in the reactor core, the fuel releases iodine and other fission products, with the result that an aggressive atmosphere with gradually increasing pressure builds up therein and the volume of the fuel itself also increases. Particular mechanical-thermal-chemical stresses which may result in the destruction of the cladding tube and make it necessary to interrupt the reactor operation to replace the fuel rod therefore occur on the inside of the cladding tube. In relation to boiling-water reactors in particular, use is therefore frequently made of composite tubes which have, on their inside, a thin layer of pure zirconium or of an alloy which is optimized in relation to higher ductility and a resistance which is adapted to the chemical, mechanical and thermal conditions. The remaining, thick outer layer of the cladding tube on one hand provides for the necessary mechanical robustness of the entire cladding tube and on the other hand is proof against corrosion under the conditions of the coolant. A liquid/vapor mixture mainly includes water at moderate pressure and moderate temperature, and includes the Zircaloy 2 already mentioned.

Modern pressurized-water reactors have a fuel assembly structure and reactivity distribution which make it possible to increase the cost effectiveness as a result of long service lives, high burn-ups and increased operating temperatures. However, a requirement in that connection is that the fuel assembly failure probability due to cladding tube defects is kept extremely low. In that connection, the emphasis is on efforts to eliminate primary damage to the outer surface of the cladding tube since, as a result of such primary defects at any point in the long cladding tube, the high pressure in the coolant flow can force water into the cladding-tube interior where it reacts with the hot fuel. The consequence may then be devastating secondary damage on the inside of the cladding tube.

Therefore, for the first time, Published European Application No. 0 212 351 A1, corresponding to U.S. Pat. No. 4,735,768, proposes, as a cladding tube for a water-cooled reactor fuel assembly, a double-layer composite tube having an inner layer, adjacent the fuel, which occupies 80 to 95% of the total wall thickness of the cladding tube and is formed of Zircaloy 4, while the thin outer layer is formed of zirconium containing 0.5% iron and 0.25% vanadium. The so-called "duplex tube", which is used as the carrier that determines the mechanical properties of the entire cladding tube, generally has a thick layer of Zircaloy 2 or Zircaloy 4 to which a thin, outer protective layer of a second zirconium alloy is metallurgically bonded (for example by combined extrusion of two concentric tubes). The alloy contains 0.1 to 1% vanadium and/or 0.1 to 1% platinum and/or 1 to 3% copper, and optionally up to 1% iron. All of the percentages are based on the weight of the alloys.

Such cladding tubes exhibit an excellent behavior and, in particular, even at burn-ups of between 40 and 60 MWd/kg of uranium, only oxide layers having thicknesses below 20 µm occur at the outer surface which is exposed to the pressurized water, while the mechanical behavior, such as the increase in length and the shrinkage of the fuel-rod diameter, is within the range of the most favorable values obtained with one-piece tubes of Zircaloy 4. However, those cladding tubes are comparatively expensive, and in particular, the outer alloy is difficult to process mechanically because of its hardness and requires lengthy, careful processing steps with an increased reject occurrence. In addition, the alloying constituents of the second alloy are not permitted per se as reactor materials because of the high neutron absorption and can only be tolerated because they are used only in the thin outer layer in low concentrations. However, the reject material produced during the cladding-tube manufacture cannot readily be fed back into the cladding-tube production since the alloying constituents contained in the second alloy result in impurities in the zirconium or zircaloy which cannot be tolerated. The excellent results of that duplex cladding tube is attributed, in particular, to the absence of tin in the outer layer.

Published European Application No. 0 301 295 A1, corresponding to U.S. Pat. No. 4,963,316, describes a duplex cladding tube which is easier to process and in which the outer layer is formed of a tin-free zirconium alloy containing 2.5% niobium or at least a low-tin alloy containing 0.25% tin, 0.5% iron and 0.05% chromium. Good results are expected for a niobium content between 0.2 and 3% and/or a total content of iron, chromium, nickel and tin of between 0.4 and 1.0%. U.S. Pat. No. 5,023,048 describes a similar fuel rod in which the outer layer is formed of Zr, (0.35 . . . 0.65) % Sn, (0.2 . . . 0.65) % Fe, (0.24 . . . 0.35) % Nb and (0.09 . . . 0.16) % O and contains no chromium.

Whereas the fuel assemblies of boiling-water reactors are exposed to a coolant temperature of about 280° C. at a pressure of 70 bar, the surface temperature of the cladding tubes of pressurized-water reactors is about 340° C., with the coolant having an outlet temperature of about 320° C. at 170 bar. Despite the fact that the differences in the operating conditions at first appear relatively small, the corrosion processes occurring under those circumstances differ markedly. Laboratory experiments which were carried out at elevated temperatures (for example 360° to 550° C.), that is to say in the vicinity of or above the critical temperature of water, in order to shorten the test times and to intensify the corrosion conditions in the development of Zircaloy 2 and Zircaloy 4, are therefore only of limited meaningfulness for the corrosion behavior.

In addition, measures which may have an effect on the corrosion processes occurring at the fuel rods are taken by individual power-station operators for other reasons, for example to prevent corrosion of heat exchangers or other components in the coolant circuit. Measures which may result in an alteration in the corrosion occurring at the fuel-rod claddings are also taken during start-up or during certain temporary operating states.

Thus, for example, fuel rods of pressurized-water reactors which are operated at a coolant outlet temperature of 316° C. on average may exhibit an excellent behavior but may exhibit a higher failure probability even in reactors having mean coolant outlet temperatures of 326° C. which, although slight, is undesirable. One of the causes thereof may be the strong temperature dependence of hydrogen diffusion during very long service lives. At the start of the operation of some nuclear reactors, a small amount of dissolved lithium hydroxide, which may considerably affect the corrosion of the cladding tubes, is present in the coolant circuit.

In particular, an increase in fuel-rod power may result in a fuel-rod outer temperature which is in fact only a few degrees higher but at which local boiling resulting in substantially more severe corrosion conditions occurs in the pores of the oxide layer. However, the Li content in the cooling water, which is not enough to cause problems in conventional fuel-assembly structures, may concentrate in the pores during local boiling and make it necessary either to change over to other alloys or to dispense with the increase in output.

SUMMARY OF THE INVENTION

It is accordingly an object of the invention to provide a nuclear-reactor fuel rod with a double-layer cladding tube and a fuel assembly containing such a fuel rod, which overcome the hereinafore-mentioned disadvantages of the hereto-fore-known devices of this general type and which provide a fuel assembly having fuel-rod cladding tubes that can be produced more efficiently and are adapted to the operating conditions of modern pressurized-water reactors.

In order to achieve this object, the invention proceeds from the requirement that no completely new alloys whose approval as a material in reactor technology is possible only by means of extensive, time-consuming and expensive proceedings, are used in this connection. In the case of the inner tube surface, it is assumed that Zircaloy 2 and, in particular, Zircaloy 4 are adequately adapted to the conditions prevailing there during the pressurized-water operation and, with an appropriate thickness of an inner layer of a cladding-tube manufactured therefrom, also ensure the load capacity which is to be required for the cladding tube as a whole. If possible, no alloying constituents that are not permitted for Zircaloy 2 and Zircaloy 4 are to be used for the alloy of the outer layer either. As a result, although it is possible to have recourse to the earlier, extensive experience with zircaloy in pressurized-water reactors, the proportions by weight of the individual alloying constituents of the outer layer must be redetermined, in particular, in relation to the long-term behavior during corrosion and hydrogen take-up, and opposing, mutually exclusive trends may occur which have to be compensated for by a fresh optimization.

At the same time, a substantial deviation from the concentration ranges which are valid for zircaloy is also avoided for the alloy of the outer layer. On one hand, this facilitates the approval and acceptability of the cladding tubes for use in nuclear reactors and on the other hand, it also makes it possible to recirculate waste and reject material in the cladding-tube manufacture. In particular, the thick supporting layer can comply strictly with the zircaloy specifications if this is necessary, but on the other hand, certain, slight deviations also appear possible and justifiable in order, for example, to adapt the inner layer even better to the mechanical-thermal-chemical stresses prevailing at the inner surface of the cladding tube. In addition, it is also possible, if necessary, to increase the resistance of the outer layer to a lithium-containing coolant during long operating times. At the same time, the serviceability of the novel fuel rods is also to include pressurized-water reactors which operate, for example, at slightly higher coolant temperatures and/or with lithium additions in the coolant.

With the foregoing and other objects in view there is provided, in accordance with the invention, a fuel rod of a pressurized-water-cooled fuel assembly, comprising a fuel filling, a cladding tube enclosing the fuel filling and including a first thicker inner layer facing toward the fuel filling and being formed of a first zirconium alloy, and a second thinner outer layer being metallurgically bound to the inner layer and being formed of a second zirconium alloy, the two zirconium alloys each containing at least the metals tin, iron and chromium as alloying constituents, and:

a) the first alloy containing 1–2% by weight of Sn, 0.05–0.25% by weight of Fe and 0.05–0.2% by weight of Cr;

b) the second alloy having 0.5–1.3% by weight of Sn, 0.15–0.5% by weight of Fe and 0.05–0.4% by weight of Cr;

c) the second alloy having a total content of tin, iron and chromium of more than 1.0% by weight and a content of tin having a ratio to the content of tin in the first alloy being between 0.35 and 0.7; and d) a ratio of the content of iron and chromium in the second alloy to the tin content of the first alloy being between 0.2 and 0.5.

With the objects of the invention in view, there is also provided a fuel assembly of a pressurized-water reactor, comprising fuel rods as described above.

The experimental finding, which is discussed below in even greater detail, shows that a higher tin content, which is necessary to harden the zirconium, adversely affects the corrosion with oxide layer thicknesses of about 100 μm, such as those which occur on cladding tubes in a reactor but are observed in laboratory tests at about 350° C. only after long test times. This long-term corrosion decreases with decreasing tin content. Although an iron content frequently results in brittle precipitates which result in problems during mechanical processing, it does inhibit the long-term corrosion and limits the hydrogen take-up, particularly in conjunction with chromium.

The invention therefore envisages a double-layer structure of the cladding tube in which the limits for the content of tin, iron and chromium in the two alloys are modified with respect to the zircaloy specification, with the tin content in the outer layer ("(Sn)(outer)") being reduced, although without falling below a minimum content of tin, iron and chromium:

(Sn)(outer)+(Fe+Cr) (outer)>1%

In the case of the tin content, it has to be borne in mind in this connection that a too-severe reduction in the outer layer entails the risk of heretofore unnoticed damage (for example, increased corrosion in the presence of lithium added to the coolant for other reasons) occurring. Although values which prove to be unfavorable in relation to corrosion and hydrogenation are provided for the tin content in the specification of the zircaloy because of the required hardness of the cladding tube, the tin in the inner layer can be enriched provided an adequate content of iron and chromium in the outer layer provides protection against corrosion and hydrogenation. Advantageously, this (Fe+Cr) content of the outer layer is higher than in the inner layer. However, in order to avoid difficulties due to the hardening of the inner layer (Sn content!) and the embrittlement of the outer layer (content of Fe+Cr!) during the processing and in order to ensure a metallurgical bond between the two layers (for example, by combined extrusion of two coaxial tubes), the tin content of the outer layer, in relation to the tin content of the inner layer ("(Sn)(inner)"), is reduced in accordance with:

| (Sn)(outer) | >0.35 (preferably ≧ 0.40), |
|---|---|
| (Sn)(inner) | |
| (Sn)(outer) | <0.7 (preferably ≦ 0.65), |
| (Sn)(inner) | |
| (Sn)(inner) | ≧2 × (Fe + Cr) (outer), |
| (Sn)(inner) | ≦5 × (Fe + Cr) (outer). |

Since both layers are therefore essentially composed of the same alloys which are present only in modified quantitative ratios, a composite body of these mutually similar alloys can be manufactured and processed further largely without problems.

Table 2 specifies upper limits and lower limits for the concentrations of the individual alloying constituents in the first and second alloy, with advantageous or preferred values which narrow the concentration ranges further being specified in the brackets.

The different composition of the two alloys composed of the same alloying constituents may result in reject material or waste produced during the cladding tube manufacture having a mean composition which is slightly outside the limits permitted for Zircaloy 2 or Zircaloy 4 but is usable for the manufacture of the first layer. In relation to the long-term corrosion and the hydrogen take-up, the standardization of Zircaloy 2 and Zircaloy 4 in any case appears to be not completely optimum according to the test results presented below and a slight shift in the concentration limits would probably also be tolerable for approval authorities and power-station operators. The invention therefore results in the minimum and maximum proportions by weight of tin, iron and chromium specified in Table 2 for the inner layer. In addition, the lower and upper limits of the proportions by weight of these metals in the outer layer provided in accordance with the invention are specified. Narrower limits are partly the result of the requirement that the amounts of all of the constituents of the first layer are to lie within the limits permitted for Zircaloy 2 or Zircaloy 4 and are specified in brackets. In this connection, the brackets also contain in some cases advantageous or particularly preferred limit values which result, in particular for the second alloy ("outer layer"), from the test results due to optimization.

Common to both layers is the fact that, in addition to tin, iron and chromium, they advantageously contain only further alloying constituents which are permitted for Zircaloy 2 and Zircaloy 4 and the amounts of the further alloy constituents, in particular nickel, silicon and oxygen, are virtually inside the limits permitted for Zircaloy 2 or Zircaloy 4. It is expedient to adjust the content of silicon and oxygen to achieve a defined alloy having a stabilized grain structure and an advantageous grain refinement.

Other features which are considered as characteristic for the invention are set forth in the appended claims.

Although the invention is illustrated and described herein as embodied in a nuclear-reactor fuel rod with a double-layer cladding tube and a fuel assembly containing such a fuel rod, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
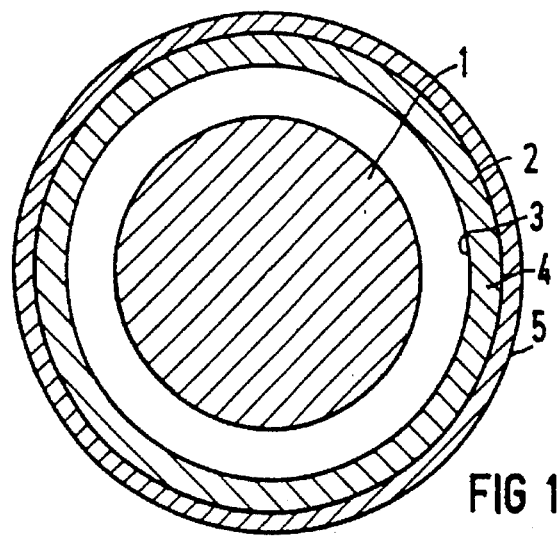
FIG. 1 is a diagrammatic, cross-sectional view of a fuel rod according to the invention.

Referring now to the figures of the drawing in detail and first, particularly, to FIG. 1 thereof, there is seen a cross section of a fuel rod which is situated in a flow of water taking place axially at a temperature of, for example, 326° C. and a pressure of about 160 bar.

In the interior of a cladding-tube 2 there is a column of fuel pellets 1 which is formed of uranium oxide or a uranium oxide/plutonium oxide mixture, that releases increasingly aggressive gases and fission products during the reactor operation. Under the influence of the reactor radiation, the material of the cladding tube 2 undergoes structural changes which result in an increase in the length of the cladding tube, while at the same time the pressure of the coolant compresses the tube. Since the volume of the fuel increases with increasing burn-up, contacts between an inner surface 3 of the cladding tube and the hot fuel occur, with the result that finally, not only aggressive chemical conditions but also mechanical and thermal stresses occur at the inner surface.

In view of these stresses, in a first exemplary embodiment of the invention, the cladding tube is manufactured as a composite body including two layers that are bound metallurgically to one another. An inner layer 4 has a thickness being about 75 to 95% of the total cladding-tube wall thickness and determining the mechanical robustness of the entire cladding tube. An alloy of the inner layer ("first alloy") is formed of sponge zirconium containing 1.5±0.1% tin, 0.21±0.03% iron, 0.1±0.03% chromium, 0.14±0.02% oxygen, 0.01± 0.002% silicon and less than 0.007% nickel. This alloy is therefore zircaloy 4 with a comparatively high content of tin, oxygen and silicon. Under the conditions of the pressurized-water reactor, it cannot be expected of this material that the cladding tube undergoes damage which starts from the inside and proceeds through the entire cladding tube.

A thin outer layer 5 is formed of an alloy ("second alloy") which, in addition to sponge zirconium, contains 0.8±0.1% tin, 0.21±0.03% iron, 0.1±0.03% chromium, 0.01±0.002% silicon and an oxygen content of between 0.12 and 0.16%. In this connection, it is assumed that no special measures are necessary to reduce the corrosion in a lithium-containing medium.

Figure 2:
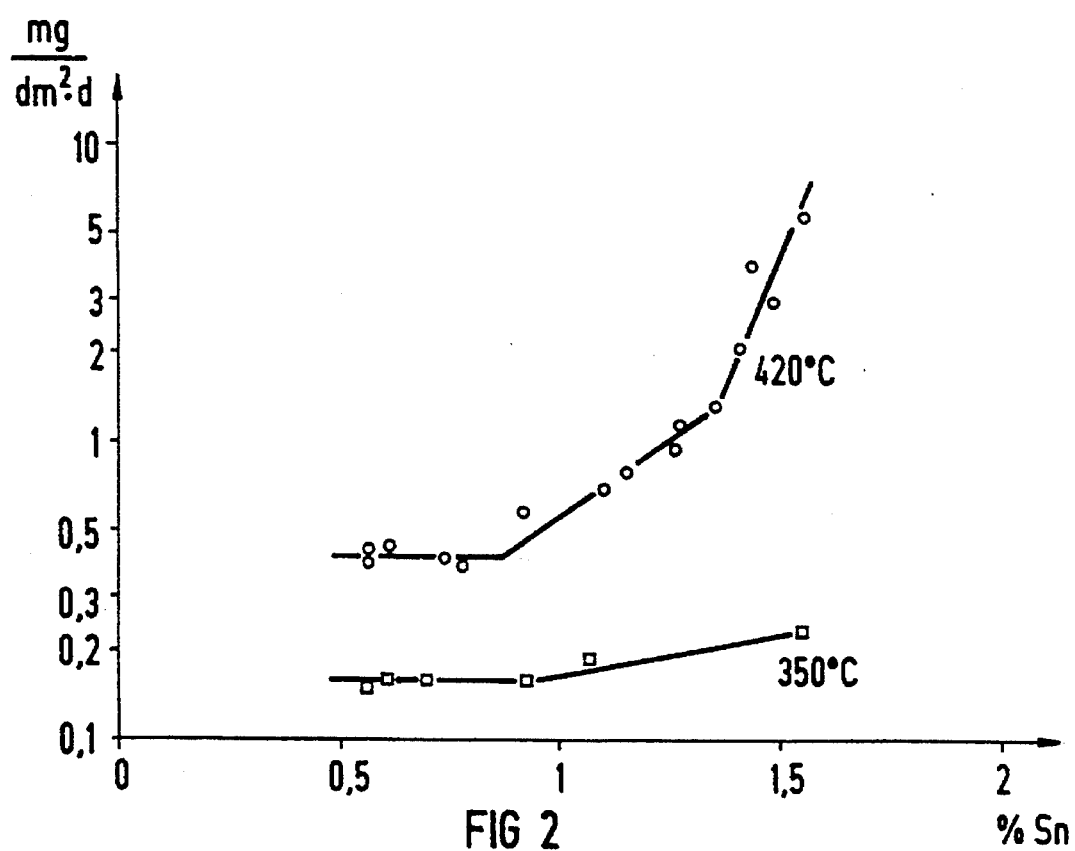
FIGS. 2 and 3 are graphs showing the effect of tin content in Zircaloy-4 workpieces upon corrosion in a laboratory test and in a reactor.

In zircaloy, the amount of tin is raised above 1.2% in view of the mechanical properties required, but it is limited to 1.7% to take account of the susceptibility to corrosion, which is increased by tin. FIG. 2 shows how the corrosion rate measured as an increase in weight in milligrams per dm$^2$ and per day depends on the tin content in the case of Zircaloy 4 ("Zry-4") in a suitable autoclave in the presence of water (350° C. at 170 bar) or steam (420° C. at 105 bar).

Figure 3:
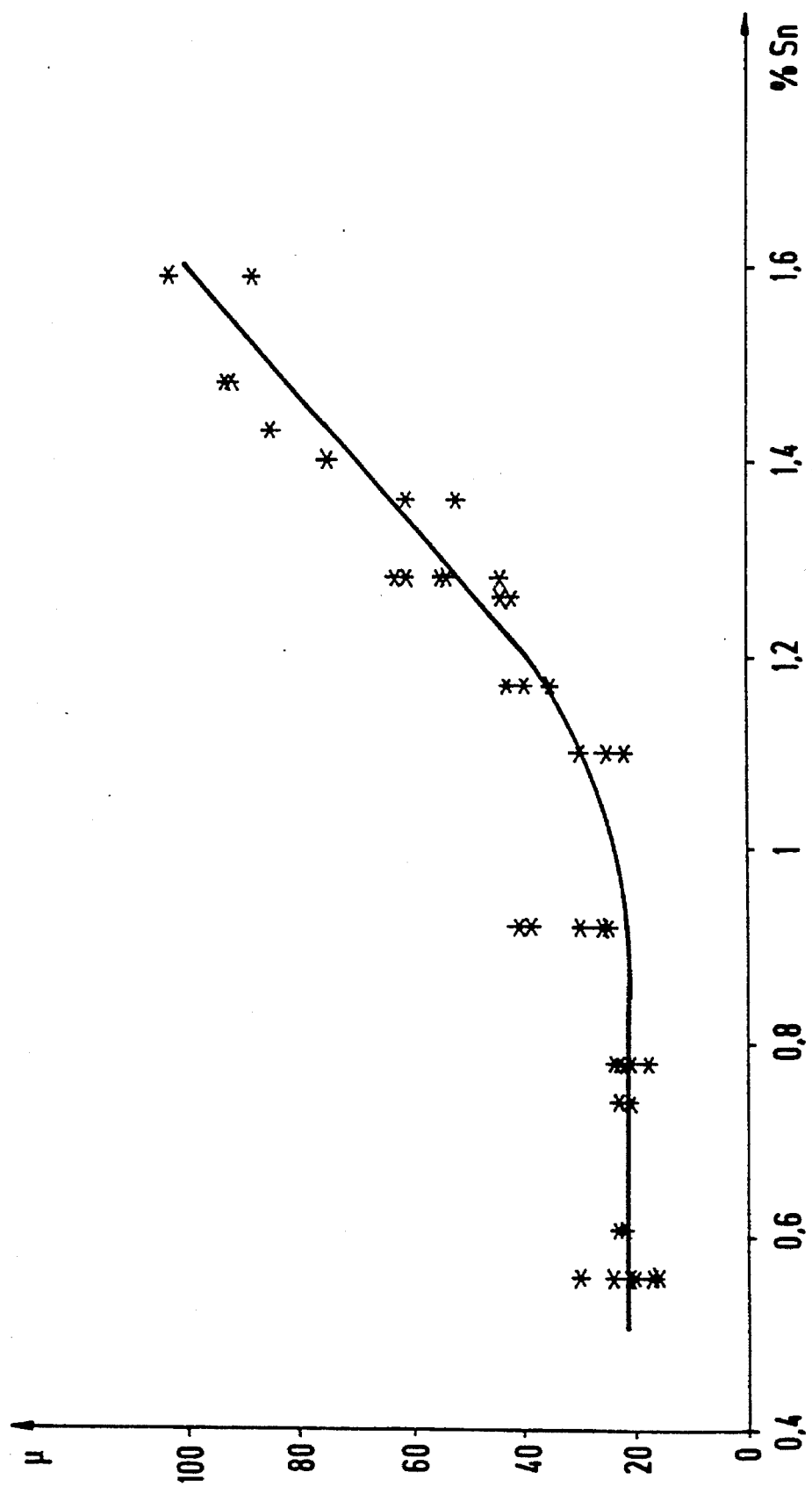

FIG. 3 shows the corresponding measured values of oxide-layer thicknesses which have formed on different workpieces during the reactor operation. In this case, an Sn gradient was maintained in a single Zry-4 melt and the material of the individual workpieces was taken from this single melt at different points. A particularly low oxidation accordingly occurs at the operating temperature of the reactor provided the tin content is kept below about 1.1%, in particular in the second alloy. However, since the inner layer is exposed to the aqueous medium only if the outer layer is destroyed, tin contents higher than this, in particular tin contents above 1.4% by weight, can be permitted in the first alloy in order to obtain advantageous mechanical cladding-tube properties.

With an iron content of more than about 0.5% by weight, zirconium alloys are brittle and can virtually no longer be processed mechanically, for example, in pilger machines. The specification of the iron content in the case of Zircaloy 2 and Zircaloy 4 was based on laboratory experiments in which an oxide layer of about 2 μm which protected the alloy against further oxidation and caused only a low corrosion rate (largely dependent on the iron content) formed at 400° C. even after about 30 days. This transition to low corrosion rates is temperature-dependent and at 360° C. it occurs, for example, only after 110 to 120 days. However, at a low iron content, a renewed growth of the oxide layer, that is to say a greater increase in weight gain, occurs as soon as the oxide layer reaches values between about 7 and 11 μm after even longer test times.

Figure 4:
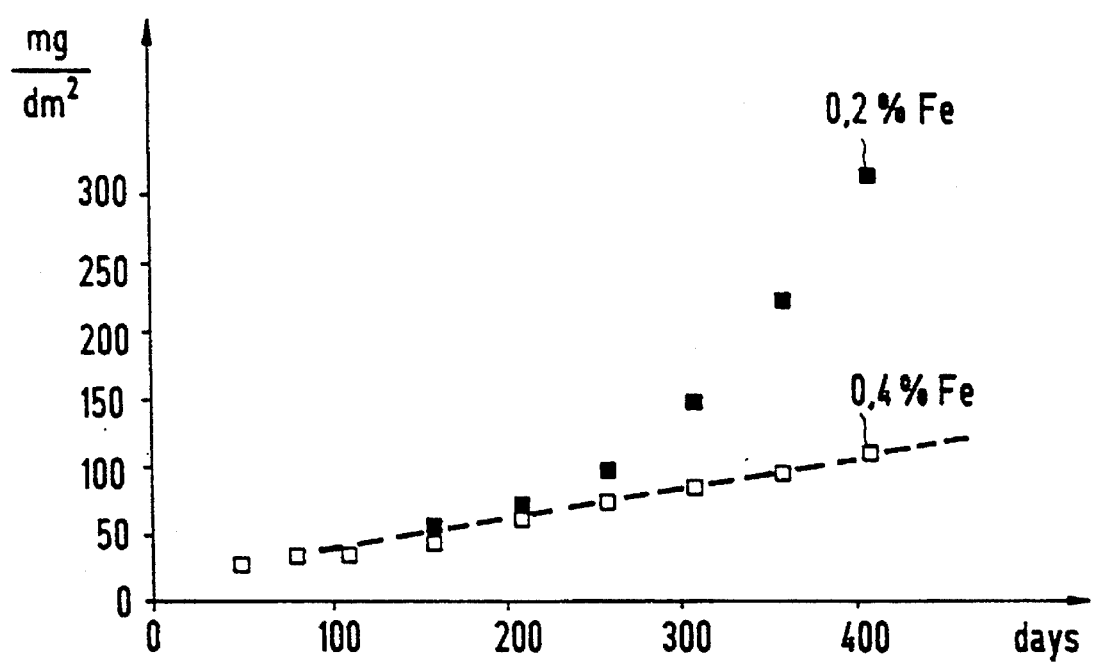
FIG. 4 is a graph showing the time dependence of the corrosion of a zirconium/tin alloy with two different iron contents during long-term experiments.

FIG. 4 shows corresponding measured values for a Zr1Sn0.1Cr alloy and iron contents of 0.2 or 0.4% in an autoclave at 370° C. and 190 bar. Within the framework of the processable iron content, as high concentrations as possible, in particular in the range of Zry-4, should be aimed for.

Figure 5:
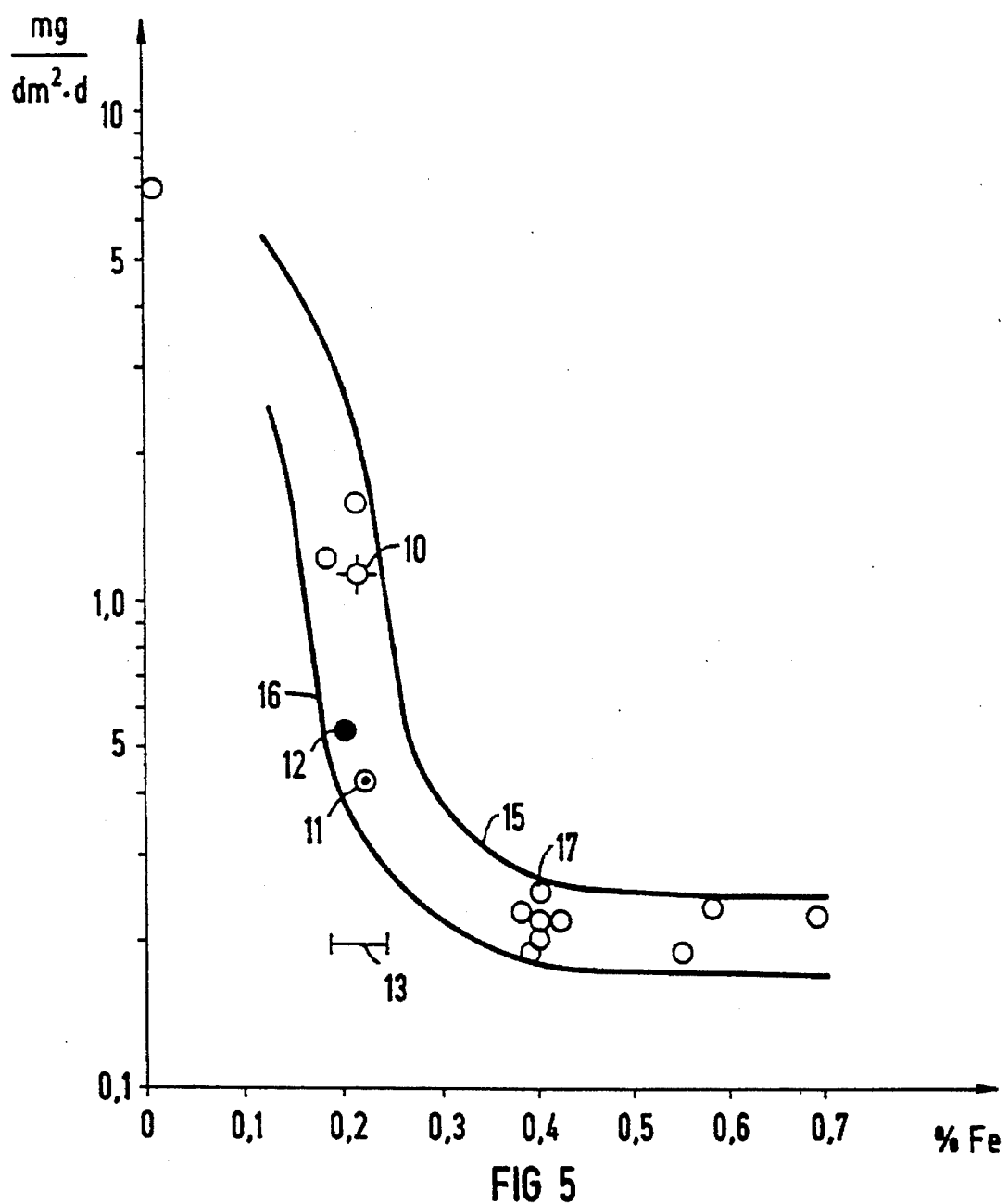
FIG. 5 is a graph showing a comparison of the corrosion rate of Zircaloy 4 with a zirconium/tin alloy having different iron contents in a long-term test.

This also emerges from the comparison shown in FIG. 5, in which the corrosion rates in a long-term test at 370° C. and 190 bar are shown for a Zry-4 spacer plate, an unforged Zry-4 plate and a pilgered Zry-4 tube by measured points 10, 11 and 12. Reference numeral 13 denotes an iron range permitted by the ASTM standard for Zry 4. Curves 15 and 16 circumscribe a range of measured values 17 which have been obtained by varying the iron content in Zry 4.

If, however, the hydrogen take-up (FIG. 6) is considered in a corrosion test in which zirconium containing 1% Sn, 0.2% or 0.4% Fe and various chromium concentrations was used in an autoclave at 370° C. for 410 days, it is found that an increase in the chromium content beyond 0.1% has an effect similar to an increased iron content.

The limitation of the iron content in the case of Zry 4 and, in particular, in the case of Zry 2 does not therefore take sufficient account of the favorable effect of this metal on the corrosion behavior in a long-term test. For this purpose, for tin contents of more than about 1%, in particular, a total content of iron and chromium of between about 0.4 and 0.5 is advantageous but this is above the specification of Zry. In the case of duplex tubes containing less tin in the outer layer, an Fe+Cr content of at least 0.25%, and in particular at least about 0.35%, can therefore be chosen in the outer layer while the zircaloy limits are approximately maintained for the inner layer. In other words, despite a higher tin content, the chosen Fe content and the chosen (Fe+Cr) content are lower than, or at most about equal to, that of the outer layer.

The specified expedient upper limits for the total content of iron and chromium of the second alloy may, for example, be 0.8% or 0.6%.

The invention makes it possible to feed back waste produced without difficulty. For this purpose, for example, a cladding tube may be considered which has an external diameter of 10.7 mm and a wall thickness of 0.27 mm. The outer layer, which is formed of Zr1.1Sn0.4Fe0.25Cr, accounts for 16% of the wall thickness, that is to say about 16.5% of the material. The inner layer is formed of Zry 2 having the composition Zr1.7Sn0.16Fe0.12Cr0.03Ni. Both alloys are furthermore specified by an oxygen content of about 0.07% and a silicon content of about 0.012%. Although the high iron content of the outer layer is beneficial in relation to the hydrogen take-up of this layer with this comparatively high tin content, this alloy is difficult to process and a relatively high reject level in the manufacture of the duplex cladding tubes can be anticipated. This reject material has the overall composition of the entire cladding tube, namely Zr1.6Sn0.2Fe0.14Cr0.03Ni, which is within the range of Zry 2. As a result of adding about the same amount of freshly drawn, comparatively cheap alloying material of the overall composition Zr1.8Sn0.12Fe0.1Cr0.05Ni to the reject material being fed back, it is therefore possible to manufacture a new melt of the alloy which is necessary for the inner layer and which is shaped by forging and extrusion into a tube and forms the core of a concentric tube blank which supports on its outside a tube that is formed in a similar manner from fresh material with the composition of the second alloy. The two tubes are welded together at the ends in vacuo so that there is no gas between the two tubes. In order to obtain a metallurgical bond between the different alloys, the tube blank is extruded and then processed mechanically to the desired dimensions, for example in a pilger machine. Expediently, annealings are carried out between or after the individual mechanical processing steps.

In contrast to this exemplary embodiment, a cladding tube in which Zr1Sn0.2Fe0.3Cr is used as the second alloy for manufacturing the outer layer, has an iron content which is reduced with a view to improved processability, with the higher hydrogen take-up associated therewith being partly compensated for by an increased chromium content.

In accordance with FIGS. 2 and 3, the reduced tin content results in a lower growth of the oxide layer.

Although FIG. 2 initially makes tin contents of less than 0.6% appear advantageous, this range is unfavorable.

The oxide layer formation depends, on one hand, on the time ("transition point") at which the more severe corrosion shown in FIGS. 3 and 4 occurs in the long-term test ("post-transition corrosion rate", PTCR) and, on the other hand, on the PCTR itself. Measures which are favorable for as low a PCTR as possible may have an unfavorable effect insofar as the transition point is brought forward, that is to say the oxide thickness growth described by the PCTR occurs even earlier.

A tin content of less than 0.7% may therefore even prove to be unfavorable in those cases in which the alloy is exposed to an aqueous LiOH solution, in which case, although the Li content itself may be very low, it considerably alters the corrosive effects, for example, because of the local boiling in the pores of the oxide layer already mentioned. Since, in view of FIGS. 5 and 6, the (Fe+Cr) content is advantageously kept above 0.25%, and in particular above 0.35%, the invention in any case provides a total content of iron, chromium and tin of more than 1% in the second alloy.

Figure 7:
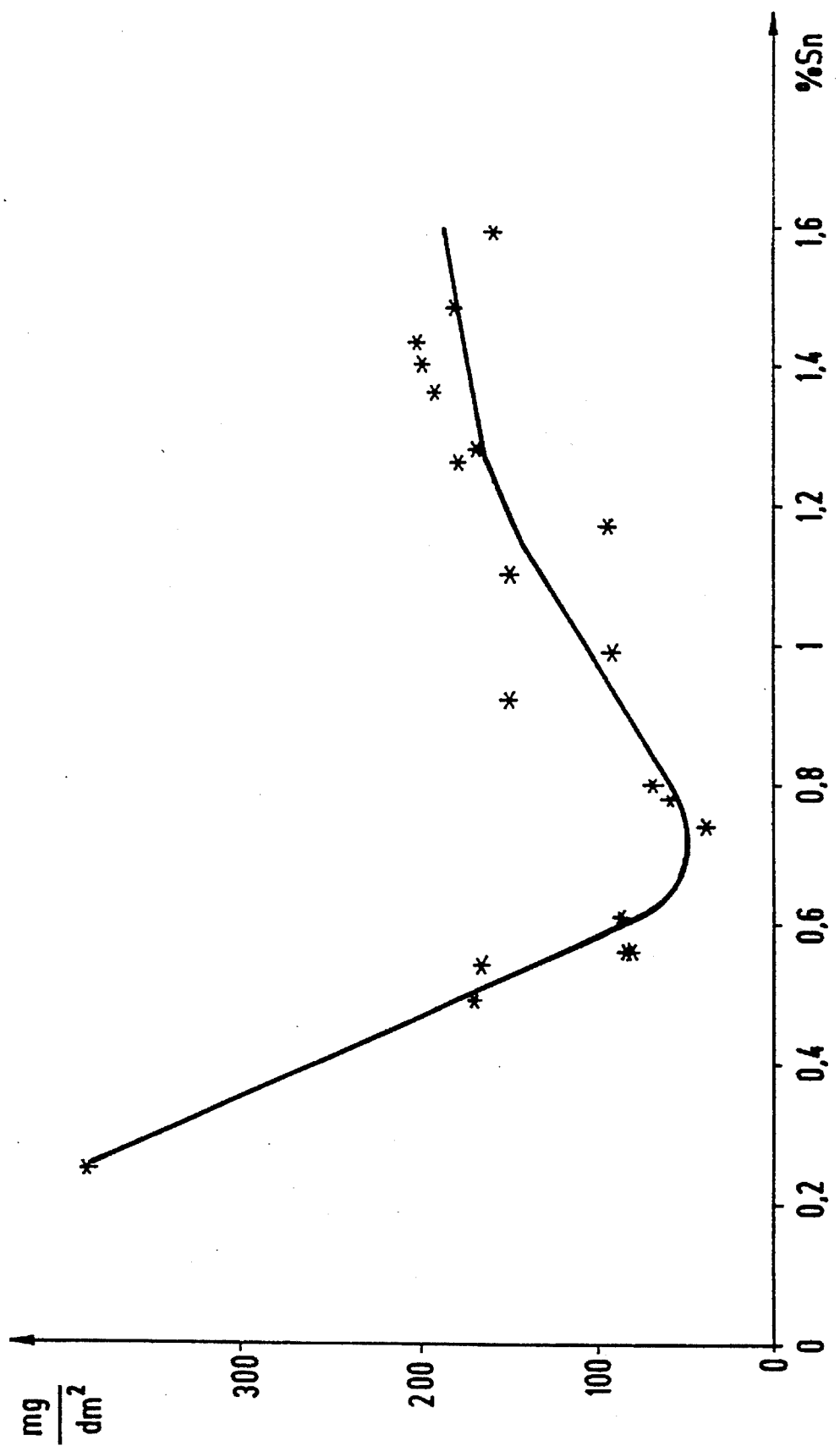
FIGS. 7 and 8 are graphs showing the effect of the Sn or Fe content on the corrosion of zirconium alloys in a lithium-containing atmosphere after 153 days.

The fuel rods can consequently also be used for outputs and temperature ranges for which dangerous corrosion damage was heretofore to be anticipated with an Li content in the cooling water. This is shown by FIG. 7 which reproduces the corrosion-induced increase in weight of the surface of a Zr 0.2 Fe 0.1 Cr workpiece under pressurized water at 170 bar and 350° C. containing 70 ppm of Li and after 153 days in an autoclave as a function of the Sn content.

Figure 8:
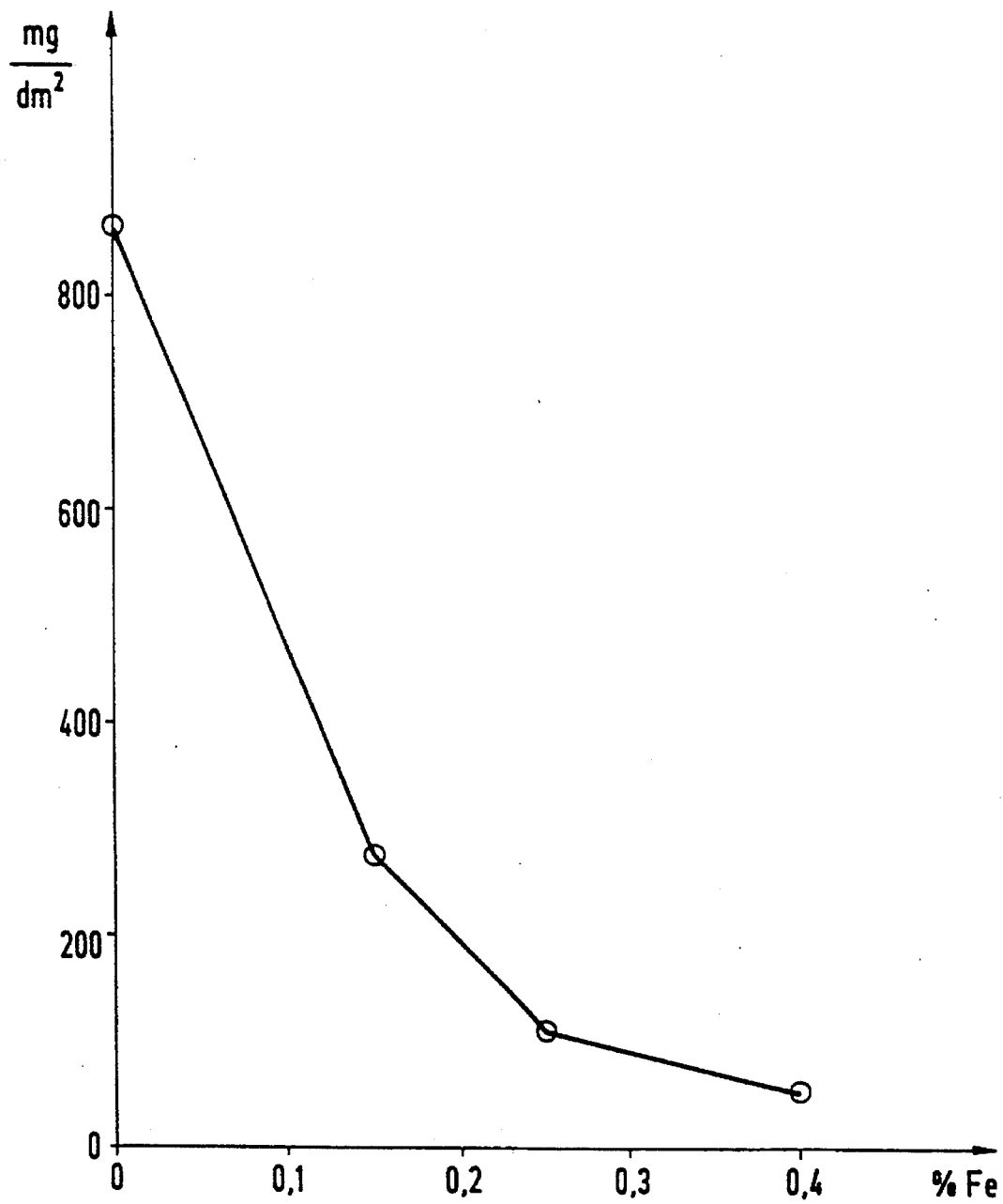

FIG. 8 shows the measurement results of the same corrosion test for a Zr-base alloy containing 0.5% Sn as a function of the iron content. Similar relationships often also result if further alloying constituents (for example 0.5% Nb) are also added in addition.

FIGS. 2 to 8 result in an advantageous outer layer of the cladding tube composed of an alloy of Zr, (0.8±0.1) Sn (0.28±0.04) Fe (0.17±0.03) Cr. Advantageously, Zircaloy 4 with a comparatively high content of tin (of between 1.4 and 1.6) can be chosen for the inner layer. In the case of both alloys, it is advantageous to establish a defined content of oxygen and silicon, for example (0.14±0.02) % O and (0.01± 0.002) % Si.

Figure 6:
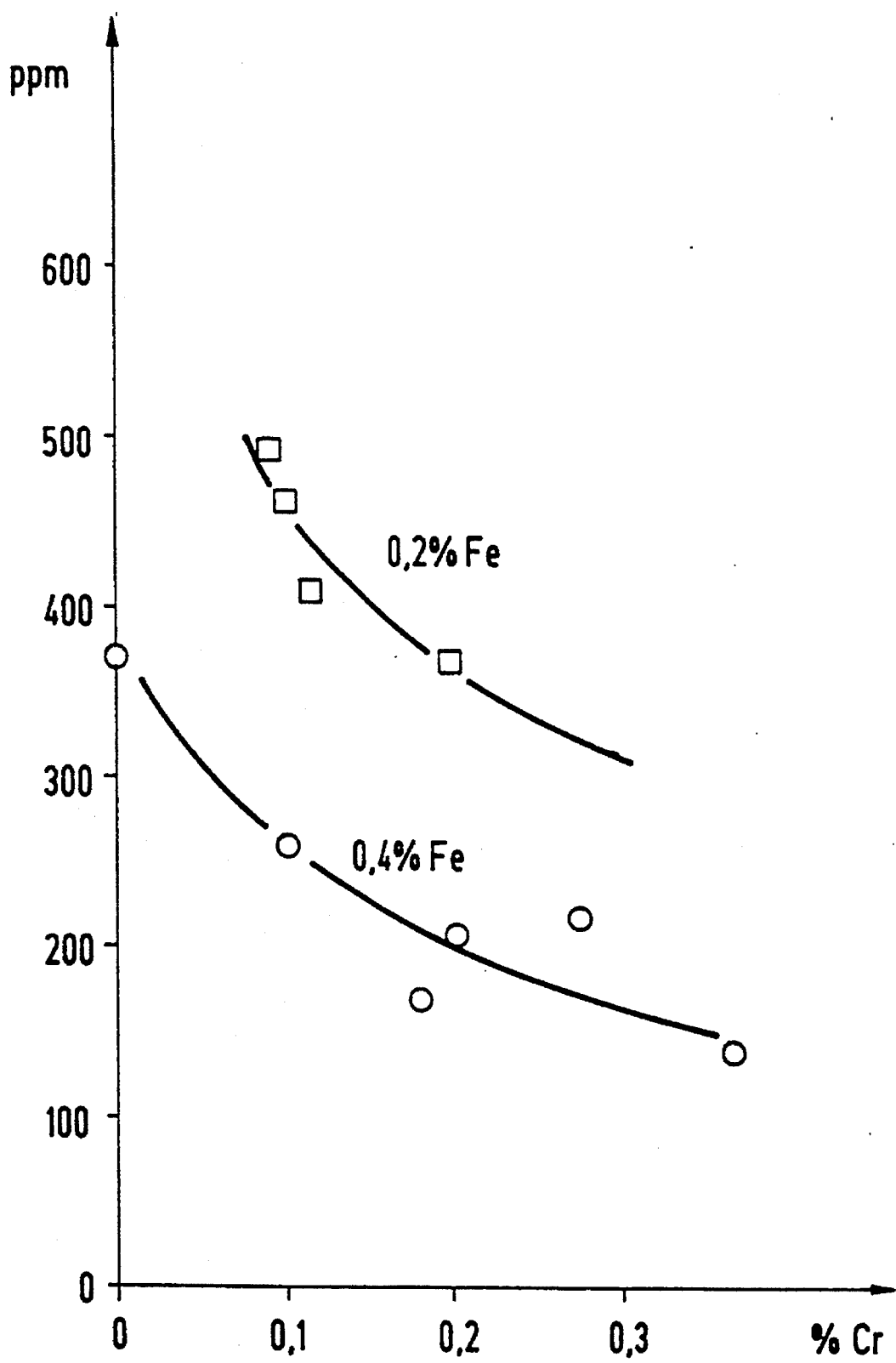
FIG. 6 is a graph showing the hydrogen take-up of two ZrSnFeCr alloys after 410 days.

This first alloy is not optimum on the basis of the long-term investigations submitted in this case in relation to the tin content with regard to corrosion in water (FIG. 2) and in relation to the low iron content and total content of iron and chromium in regard to corrosion and hydrogen take-up (FIGS. 4 to 6). However, according to the previous experience with pressurized-water reactors, no cladding tube defects originating from the inside and extending up to the second layer are to be expected with this alloy composition. This first layer largely determines the required mechanical properties of the cladding tube. The cladding tube is protected against a corrosive attack and hydrogenation due to the coolant (even in the case of a lithium-containing solution) by the second layer which has, for this purpose, a higher content of iron and Fe+Cr and, with a low tin content, a total content of tin, chromium and iron which is above 1.0%. Both layers of the composite tube include the same metals as alloying additives.

TABLE 1

| | Content in % by weight | | |
|---|---|---|---|
| | Sponge Zr | Zry 2 | Zry 4 |
| Sn | <0.005 | 1.2 ... 1.7 | 1.2 ... 1.7 |
| Fe | <0.150 | 0.07 ... 0.20 | 0.18 ... 0.24 |
| Cr | <0.020 | 0.05 ... 0.15 | 0.07 ... 0.13 |
| Ni | <0.007 | 0.03 ... 0.08 | <0.007 |
| | | Fe & Cr & Ni: | Fe & Cr: |
| | | 0.18 ... 0.38 | 0.28 ... 0.37 |
| $O_2$ | <0.14 | | |
| Si | <0.012 | <0.012 | <0.012 |

TABLE 2

| | Alloying constituents (% by weight) Remainder: zirconium | | | |
|---|---|---|---|---|
| | 1st alloy | | 2nd alloy | |
| | min. | max. | min. | max. |
| Sn | 1(1.2/1.4) | 2(1.7/1.6) | 0.5(0.7) | 1.3(1.1/0.9) |

TABLE 2-continued

| | Alloying constituents (% by weight) Remainder: zirconium | | | |
|---|---|---|---|---|
| | 1st alloy | | 2nd alloy | |
| | min. | max. | min. | max. |
| Fe | 0.05(0.07/0.1/0.18) | 0.25(0.24) | 0.15(0.18/0.24) | 0.5(0.4/0.35) |
| Cr | 0.05(0.07) | 0.2(0.13) | 0.05(0.07/0.13) | 0.4(0.25/0.21) |
| Fe + Cr + Sn | | | 1.0 (1.1) | (1.8/1.5) |
| Ni | ~0 | (0.08/0.007) | ~0 | 0.007 |
| Si | (0.005/0.007) | (0.02/0.012) | (0.005/0.007) | (0.02/0.012) |
| O | (0.05/0.07/0.12) | (0.2/0.16) | (0.05/0.07/0.12) | (0.2/0.16) |

We claim:

1. A fuel rod of a pressurized-water-cooled fuel assembly, comprising a fuel filling, a cladding tube enclosing said fuel filling and including a first thicker inner layer facing toward said fuel filling and being formed of a first zirconium alloy, and a second thinner outer layer being metallurgically bound to said inner layer and being formed of a second zirconium alloy, said two zirconium alloys each containing at least the metals tin, iron and chromium as alloying constituents, and:
   a) said first alloy containing 1–2% by weight of Sn, 0.05–0.25% by weight of Fe and 0.05–0.2% by weight of Cr;
   b) said second alloy having a content of 0.5–1.3% by weight of Sn, 0.15–0.5% by weight of Fe and 0.05–0.4% by weight of Cr;
   c) said second alloy having a total content of tin, iron and chromium of more than 1.0% by weight, a ratio of the content of tin in said second alloy to the content of tin in said first alloy being between 0.35 and 0.7; and
   d) a ratio of the content of iron and chromium in said second alloy to the tin content of said first alloy being between 0.2 and 0.5.

2. The fuel rod according to claim 1, wherein each of said layers contains only further alloying constituents permitted for Zircaloy 2 and Zircaloy 4 in addition to Sn, Fe and Cr, said further alloying constituents having amounts being substantially within limits permitted for one of Zircaloy 2 and Zircaloy 4.

3. The fuel rod according to claim 1, wherein all of said constituents of said first layer have amounts being within limits permitted for one of Zircaloy 2 and Zircaloy 4.

4. The fuel rod according to claim 1, wherein at least said second alloy has a nickel content of less than about 0.007% by weight.

5. The fuel rod according to claim 1, wherein said cladding tube has a silicon content of more than 0.005% by weight and less than 0.02% by weight.

6. The fuel rod according to claim 1, wherein said cladding tube has a silicon content of more than 0.007% by weight and less than 0.012% by weight.

7. The fuel rod according to claim 1, wherein each of said two alloys of said cladding tube has a silicon content of more than 0.005 by weight and less than 0.02% by weight.

8. The fuel rod according to claim 1, wherein each of said two alloys of said cladding tube has a silicon content of more than 0.007% by weight and less than 0.012% by weight.

9. The fuel rod according to claim 1, wherein said cladding tube has an oxygen content of less than 0.2% by weight and more than 0.05% by weight.

10. The fuel rod according to claim 1, wherein said cladding tube has an oxygen content of less than about 0.16% by weight and more than 0.12% by weight.

11. The fuel rod according to claim 1, wherein the tin content of said first alloy is more than 1.2% by weight and less than 1.6% by weight.

12. The fuel rod according to claim 1, wherein the tin content of said first alloy is more than 1.4% by weight and less than 1.6% by weight.

13. The fuel rod according to claim 1, wherein the tin content of said second alloy is more than 0.7 and less than 1.1 by weight.

14. The fuel rod according to claim 1, wherein the tin content of said second alloy is more than 0.7 and less than 0.9% by weight.

15. The fuel rod according to claim 1, wherein the iron content of said first alloy is more than 0.1% by weight and less than 0.24% by weight.

16. The fuel rod according to claim 1, wherein the iron content of said first alloy is more than 0.18% by weight and less than 0.24% by weight.

17. The fuel rod according to claim 1, wherein the iron content of said second alloy is more than 0.18% by weight and less than 0.4% by weight.

18. The fuel rod according to claim 1, wherein the iron content of said second alloy is more than 0.24% by weight and less than 0.35% by weight.

19. The fuel rod according to claim 1, wherein the chromium content of said first alloy is more than 0.07 and less than 0.13% by weight.

20. The fuel rod according to claim 1, wherein the chromium content of said second alloy is more than 0.07% by weight.

21. The fuel rod according to claim 1, wherein the chromium content of said second alloy is more than 0.13% by weight.

22. The fuel rod according to claim 1, wherein the chromium content of said second alloy is less than 0.25% by weight.

23. The fuel rod according to claim 1, wherein the chromium content of said second alloy is less than 0.21% by weight.

24. The fuel rod according to claim 1, wherein the total content of chromium, iron and tin of said second alloy is between 1.1 and 1.5% by weight.

25. The fuel rod according to claim 1, wherein said first zirconium alloy has a content of (1.5±0.1) % by weight of Sn; said second alloy has a content of (0.8±0.1) % by weight of Sn; and each of said zirconium alloys has (0.21± 0.03) % by weight of Fe, (0.1±0.03) % by weight of Cr, (0.14±0.02) % by weight of $O_2$, (0.01±0.003) % by weight of Si and at most 0.007% by weight of Ni.

26. The fuel rod according to claim 1, wherein said first zirconium alloy has a content of (1.5±0.1) % by weight of Sn, (0.21±0.03) % by weight of Fe and (0.1±0.03) % by weight of Cr; said second zirconium alloy has a content of (0.8±0.1) % by weight of Sn, (0.28±0.04) % by weight of Fe and (0.17±0.04) % by weight of Cr; and each of said zirconium alloys has a content of (0.14±0.02) % by weight of O, (0.01±0.003) % by weight of Si and not more than 0.007% by weight of Ni.

27. A fuel assembly of a pressurized-water reactor, comprising fuel rods each including a fuel filling, a cladding tube enclosing said fuel filling and having a first thicker inner layer facing toward said fuel filling and being formed of a first zirconium alloy, and a second thinner outer layer being metallurgically bound to said inner layer and being formed of a second zirconium alloy, said two zirconium alloys each containing at least the metals tin, iron and chromium as alloying constituents, and:

a) said first alloy containing 1–2% by weight of Sn, 0.05–0.25% by weight of Fe and 0.05–0.2% by weight of Cr;

b) said second alloy having a content of 0.5–1.3% by weight of Sn, 0.15–0.5% by weight of Fe and 0.05–0.4% by weight of Cr;

c) said second alloy having a total content of tin, iron and chromium of more than 1.0% by weight, a ratio of content of tin in said second alloy to the content of tin in said first alloy being between 0.35 and 0.7; and d) a ratio of the content of iron and chromium in said second alloy to the tin content of said first alloy being between 0.2 and 0.5.

* * * * *